(12) United States Patent
Gardiner

(10) Patent No.: US 8,873,146 B2
(45) Date of Patent: Oct. 28, 2014

(54) ATTACHMENT METHODS FOR DAYLIGHTING FILMS

(71) Applicant: SerraLux Inc., San Jose, CA (US)

(72) Inventor: Mark E. Gardiner, Santa Rosa, CA (US)

(73) Assignee: SerraLux Inc., Los Gatos, CA (US)

( * ) Notice: Subject to any disclaimer, the term of this patent is extended or adjusted under 35 U.S.C. 154(b) by 0 days.

(21) Appl. No.: 13/694,236

(22) Filed: Nov. 9, 2012

(65) Prior Publication Data

US 2014/0133030 A1    May 15, 2014

(51) Int. Cl.
*G02B 17/00*    (2006.01)
*G02B 27/00*    (2006.01)

(52) U.S. Cl.
USPC .......................... 359/592; 359/595; 359/597

(58) Field of Classification Search
USPC ................. 359/592, 597–598, 595
See application file for complete search history.

(56) References Cited

U.S. PATENT DOCUMENTS

| | | | | |
|---|---|---|---|---|
| 3,594,964 | A | * | 7/1971 | Clark .............................. 52/241 |
| 5,740,993 | A | * | 4/1998 | Siepe-Noll ................. 296/146.6 |
| 5,880,886 | A | * | 3/1999 | Milner .......................... 359/599 |
| 6,980,728 | B2 | * | 12/2005 | Ladstatter et al. ............ 385/146 |
| 7,349,154 | B2 | * | 3/2008 | Aiura et al. .................... 359/449 |
| 2002/0159154 | A1 | * | 10/2002 | Milner .......................... 359/613 |
| 2010/0208351 | A1 | * | 8/2010 | Nofi et al. ..................... 359/589 |
| 2011/0043919 | A1 | * | 2/2011 | Ko et al. ....................... 359/592 |
| 2012/0033302 | A1 | * | 2/2012 | Suzuki et al. ................. 359/597 |
| 2013/0038928 | A1 | * | 2/2013 | Padiyath et al. .............. 359/359 |

* cited by examiner

*Primary Examiner* — Christopher Mahoney
(74) *Attorney, Agent, or Firm* — Michael Hetherington Attorney at Law

(57) ABSTRACT

Attachment methods for daylighting sheets and a resulting optical construction enable daylighting microstructures to be secured to a light incident surface, such as a glazing. Applying an adhesive to selected portions of the daylighting microstructures creates a transparent, optical adhesive surface that enables the daylighting microstructures to be oriented outward, facing the incident light, and effectively seals the microstructures against the glazing to prevent ingress of dust and contaminants that would degrade optical efficiency.

15 Claims, 19 Drawing Sheets

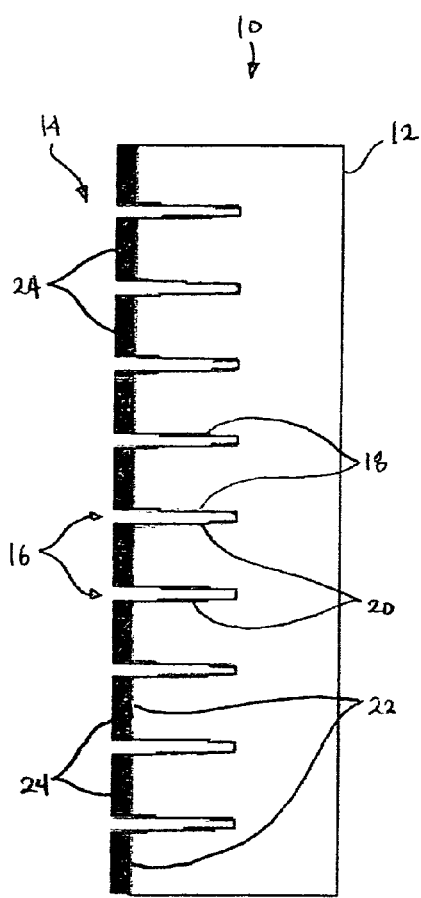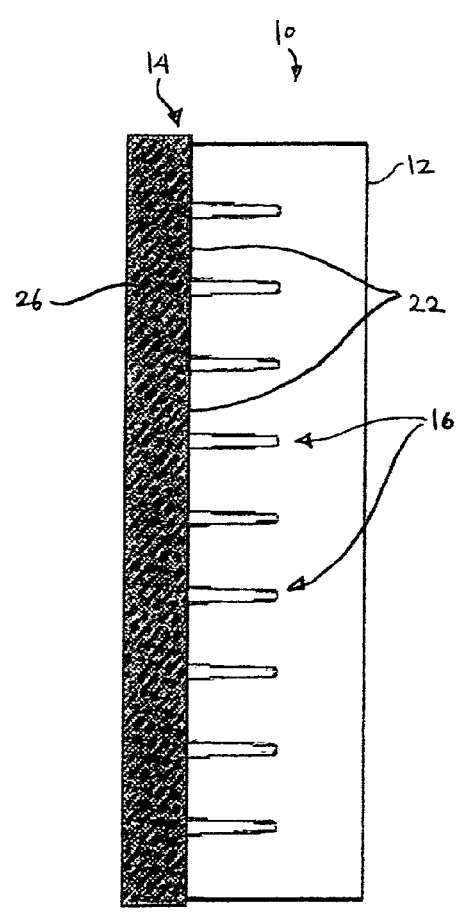
FIG. 1A
FIG. 1B

ATTACHMENT METHODS FOR DAYLIGHTING FILMS

FIELD OF THE INVENTION

The field of the invention generally relates to methods for attaching daylighting sheets or films to at least one light transmissive surface. More particularly, the field of the invention relates to methods for facilitating attachment of a daylighting sheet or film, comprising a series of microstructures and/or grooves provided therein, to a transparent light incident surface, such as a glazing surface. The grooves of the daylighting film can be attached directly to the glazing surface without adversely affecting optical properties of the daylighting film.

BACKGROUND

Daylighting methods for increasing the amount of available light within structures are well known. Conventional daylighting methods typically employ prisms or other microstructures to guide/re-direct and/or diffuse light beams of sunlight by refraction and/or reflection to increase illumination into the interior of a room uniformly while reducing glare. Daylighting constructions frequently utilize microstructures such as a series of grooves provided in films or sheets that are capable of refracting and/or reflecting incident light through the microstructures by total internal reflection (TIR).

Daylighting methods are becoming widely adopted. Daylighting increases ambient light within a building and can result in significant energy savings by reducing or eliminating the need for electric lighting during daytime hours. One disadvantage of a building without a sunlight redirecting apparatus, or daylighting film, is the inability to project light into the interior of a building. For example, if there is no apparatus, such as a reflector positioned inside or outside the window, sunlight cannot be directed to an interior space far away from the window. That is, typical, unguided sunlight will fall on the floor near the window when incident into a room. Thus, the illuminating effect is often wasted on undesired areas.

Accordingly, methods have been introduced in an attempt to overcome this disadvantage by using unique, daylighting constructions. One such method employs a light redirecting film adapted for engagement against a window. Such light redirecting films or sheets generally include a planar base and at least one light redirecting microstructure provided on the side of the sheet opposite the base. The planar base is attached to the window such that the microstructures on the opposite side face away from the window.

However, conventional attachment methods interfere with the optical properties of the microstructure, and disadvantageously degrade light projecting properties of the daylighting film. For example, conventional attachment methods put the adhesive on the planar side or base of the micro structured film, or sheet, and adhere the base to the light incident glazing to avoid degrading the optical re-directing/daylighting properties of the microstructure defining surface opposite the base. Note, that in such a conventional assembly, the daylighting microstructures generally are disposed opposite the base and face inward into the room to be illuminated. It is generally assumed that it is not possible to provide an adhesive on the light guiding microstructures without substantially degrading optical properties and thereby defeating the daylighting effect. For this reason, conventional methods of attaching daylighting microstructures to a glazing surface face the microstructures inward into a room, and avoid covering the microstructure with adhesive.

Therefore, what is needed is an attachment system for securing a daylighting sheet comprising a series of light redirecting microstructures directly to a glazing surface without degrading the light redirecting optical properties of the resulting assembly.

A further disadvantage of conventional attachment methods of a daylighting film to a glazing, such as a window surface, is the thermal expansion coefficient mismatch between the different materials comprising the glass or glazing, heated by incident light, and the adjacent planar base of the plastic daylighting sheet or film that must be covered with adhesive to a maximum extent in order to adhere to the glazing surface. Further, PSA adhesives can migrate, which means they can flow and further change the optical properties of the daylighting sheet after time has passed. Therefore, what is needed is a new way of mounting a daylighting sheet comprising a series of microstructures to a glazing surface using a PSA formulation that does not substantially migrate, and enhances optical properties, or at a minimum does not substantially degrade optical properties of the daylighting sheet What is also needed is an attachment system that would facilitate cost effective ease of re-attachment and/or replacement of such daylighting film without damage to a glazing surface. For example, it would be desirable for an attachment method to facilitate changing position of a daylighting film to remove air bubbles or deformations without adversely affecting optical properties of the microstructures. And, such an attachment system advantageously would facilitate cost effective implementation of daylighting, thus saving energy costs for electric lighting.

SUMMARY OF THE INVENTION

In order to achieve the foregoing and other objectives, a first aspect of the invention provides a method for mounting a daylighting sheet comprising a series of light redirecting microstructures, such that the microstructures advantageously are provided directly against a transparent, light incident surface, such as a single or double pane window or other glazing, wherein optical performance and efficiency of the daylighting microstructures are improved. Such improvement of optical performance and efficiency of the daylighting microstructures may be found in the employment of the invention with a daylighting sheet that defines a series of microstructures having a series of light redirecting V grooves, such as taught in Milner et al. U.S. Pat. No. 5,880,886, incorporated herein by reference as if set forth in full. (Please refer to Operational Example, infra.

Alternatively, optical performance and efficiency of other daylighting microstructures, with the exception of prisms, employed with the attachment methods of the present invention remain substantially unaltered, or at a minimum are not substantially degraded. Light transmission properties of a prism are inherently affected by the application of an adhesive. An aspect of the invention describes ways to minimize or substantially mitigate the effect of an adhesive on overall optical performance of prism type daylighting microstructures.

An aspect of the invention provides an optical adhesive for mounting a daylighting sheet or film directly against a glazing. Glazing as used herein refers to architectural applications including clear and tinted float glass, tempered glass, and laminated glass, as well as coated glasses, all of which can be glazed singly or as double, or even triple, glazing units. The optical adhesive transmits light while minimizing adverse impacts on the light re-directing properties of the daylighting microstructures. This substantially seals grooves, prisms or other light redirecting microstructures directly against a glazing, thereby protecting the microstructures from dust, moisture, and other contaminants to provide enhanced long-term optical performance. This is not possible in conventional attachment methods wherein daylighting microstructures face outward into a room, and are open and unprotected as described above.

The foregoing aspect of the invention can facilitate ease of removal of daylighting sheets from a glazing surface without damage to the glazing or deformation of the light redirecting microstructures This facilitates ease of re-positioning a daylighting sheet to alleviate deformation and errors in positioning, or to remove formed air bubbles, or for removing the daylighting sheet without damage to the glazing at the end of the daylighting sheet's useful life. Ease of removal occurs due to selective patterning of the adhesive, i.e., less surface area contact is needed between the adhesive and the daylighting microstructures. Ease of removal also can be facilitated by the use of low tack adhesives.

In another aspect of the invention, an optical construction comprises a daylighting sheet having a base and a second surface opposite the base that defines the series of daylighting microstructures. Raised or elevated portions—relative to the base—of the daylighting microstructures are adapted to provide selected points of adhesive contact for an applied transparent adhesive. The set or locus of all adhesively contacted points define an optical, light transmissive adhesive surface or layer, for securing the daylighting microstructures directly against a glazing facing the incident light; effectively sealing the formerly open ended microstructures against ingress of dust and contaminants that would reduce optical efficiency. The light transmissive adhesive surface advantageously enables the daylighting microstructures to face outward toward the incident light and performs the optical function of facilitating the transmission of light directly to the microstructures with minimal adverse effect on the light redirecting properties of the underlying microstructures. In the case of microstructures comprising a series of light redirecting V grooves, such as taught in Milner et al. U.S. Pat. No. 5,880,886, the optical surface provided by the light transmissive adhesive allows the V groove microstructures to face outward toward the incident light. This facilitates the transmission of light over a wider range of sun elevation angles than is possible when the microstructures face inward, away from incident light.

The light transmissive adhesive surface advantageously eliminates the need for a cover sheet. This also results in a daylighting assembly that is readily moveable to facilitate installation without deformation. Ease of removal is driven by application flexibility and the need to prevent damage to expensive windows, or glazing surfaces if it ever becomes necessary to replace the daylighting film. This aspect further protects the grooves in the microstructures against deformation and degradation of optical efficiency through dust or other contaminants by adhering wide or open ends of V grooves or daylighting microstructures directly against the light incident glazing.

Both the area and depth of the adhesive applied to the grooved surface of the daylighting film readily may be controlled. Controlling the area of applied adhesive as well as controlling the depth to which the adhesive is applied within the grooves makes possible a precise adjustment of the optical properties of the daylighting film.

In another aspect, the invention comprises direct attachment of a daylighting sheet to a glazing surface, wherein the daylighting sheet defines a series of V structures having flat top grooves, such as in such as Milner et al. U.S. Pat. No. 5,880,886. This aspect of the invention enables the flat regions between V grooves to be attached directly to a glazing surface with adhesive touching only the tops of the flat regions defining the grooves. Advantageously, the adhesive does not alter the optical properties of the daylighting sheet in this configuration, but rather improves light redirecting properties as shown in the computer modeling set forth in the operational example described with reference to FIGS. 12-15 infra. Further, this aspect of the invention encases the troughs of the grooves of the microstructures directly against the glazing and thereby protects the light redirecting microstructures from dust, moisture, and other contaminants. This aspect of the invention advantageously eliminates need for a cover sheet to protect the light redirecting microstructures. It also eliminates the need for the exposed open ends of the microstructure to face inward, unprotected, into the room to be illuminated.

A further aspect of the invention provides a daylighting sheet comprising one or more microstructures defining a series of V grooves, such as Milner et al. U.S. Pat. No. 5,880,886, attached directly to a glazing surface with adhesive touching only a percentage, for example, <100%, of groove tops. In such a configuration, optical properties are essentially unaffected. The grooves are protected by being adhered directly to/against a glazing surface. The adhesive can be a border adhesive or a percentage of a contact adhesive for facilitating ease of removal and repositioning of the daylighting film.

Another way of attaching a daylighting optical structure comprises attaching a series of V grooves having flat tops between adjacent grooves (such as in U.S. Pat. No. 5,880,886) directly to a glazing using no adhesive. In this embodiment, the material for the microstructures, and in particular the material for the flat top structures, is selected from a group of polymer materials having self-adhering properties.

Another aspect of the invention provides a method for attaching a daylighting optical design defining a series of prisms (any groove form) directly to a glazing surface with adhesive having a percentage of contact, <100%. Necessarily, the adhesive does not touch every groove. Where adhesive touches the prisms, the optical properties would be modified. Therefore, the percentage of adhesive is necessarily minimized, but sufficient to adhere the daylighting film against slippage with the glazing surface. This advantageously protects the grooves and eliminates the need for a cover sheet.

In a further aspect, a daylighting sheet defining a series of prisms comprising any groove form having built-in posts enables the daylighting sheet to be adhered directly to a glazing with adhesive contacting only the posts. This construction also advantageously protects the grooves and eliminates the need for a cover sheet.

In another aspect of the invention, a daylighting sheet such as described in Milner U.S. Pat. No. 5,880,886, defining a series of V grooves, or a prism-form daylighting optical design may be attached directly to a glazing on the groove side with adhesive touching only a percentage, <100%, of grooves and forming a graphical pattern. In this embodiment, the adhesive may contain diffuser particles to enhance a graphical pattern, such as a company logo, or the like, while also yielding a daylighting function. Note, the edges of the adhesive also can be used to show the logo/graphic distinctly, without diffuser particles. This aspect of the invention enables a logo, or decorative pattern—conveying meaning or not—to be added to a daylighting sheet while fully maintaining the daylighting efficiency. This may be accomplished without scattering the light. In that case, a diffuser would be discouraged as it can scatter in many directions, which may be undesirable in some cases. If a diffuse adhesive were to be used, it would require the application of: first, a clear adhesive, and later, a second diffuse adhesive.

Note: for the V grooves with a logo, the viewer will see the rolled edges of the adhesive. For prisms with logo adhesive, wherever the adhesive contacts the prism, the prism function is canceled and becomes "clear." A viewer will then see more than the edges in this scenario.

BRIEF DESCRIPTION OF THE DRAWINGS

The foregoing and other aspects and advantages of the invention may be appreciated from the following detailed description together with the drawings—heuristic for clarity—in which:

FIGS. 1A and 1B show cross-sectional end views of daylighting microstructures and placement of an adhesive for direct attachment of a daylighting sheet or film to a glazing surface in accordance with an aspect of the invention.

DETAILED DESCRIPTION

Figure 2:
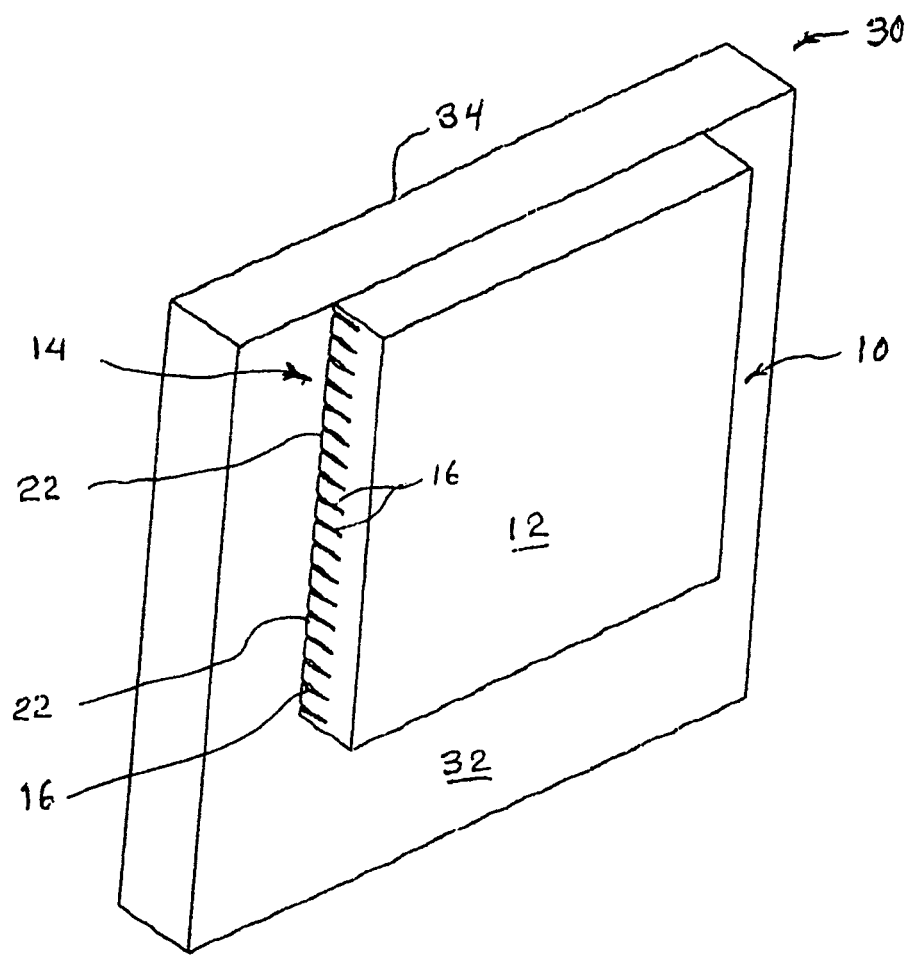
FIG. 2 shows a perspective view of another variation where a V grooved microstructure of a daylighting sheet or film may be adhered directly to a glazing.

In conventional methods for attaching or adhering daylighting sheets or films to an optically transparent structure such as a window or glazing, the planar base of the daylighting sheet is adhered to the glazing. Thus, the opposite surface of the daylighting sheet that defines the light redirecting microstructures faces into the room—away from the glazing. Moreover, such microstructures—facing into the interior of a room where light is to be redirected—are open to the environment, and unprotected from dust and other contaminants that build up over time and significantly degrade optical properties and performance.

However, it has been discovered that by mounting the daylighting sheet in accordance with aspects of the present invention, such that the microstructures that produce the daylighting effect are facing the incident light and adhered directly against the glazing, optical performance and efficiency of the daylighting sheet can be improved. This is especially true for a daylighting sheet that defines a plurality of light redirecting microstructures such as V shaped grooves, as taught in Milner et al. U.S. Pat. No. 5,880,886, incorporated herein by reference. Such V groove microstructures are shown in detail in FIGS. 1A and 1B.

In the case of grooved microstructures and prism based microstructures, mounting the daylighting sheet or film with the microstructures directly against the glazing protects the grooved structures and prisms, prolongs optical performance, and minimizes costs for implementing daylighting in buildings. Additionally, the present invention for securing the microstructure surface directly to a glazing provides the advantages of cost effective and rapid deployment, and facilitates quick removal of a daylighting sheet without damage to the glazing for re-positioning and/or replacement.

In the case of typical grooved and/or prism based daylighting microstructures, an aspect of the invention adheres the microstructure-defining surface directly against the glazing with the microstructures facing outward for receiving the incident light directly through the adjacent glazing. In this aspect it is important to control the area and depth of the adhesive applied to the grooved surface of the daylighting film. Controlling the area of applied adhesive as well as controlling the depth to which the adhesive is applied within the grooves further governs and minimizes the relative loss of the optical properties of the daylighting film.

For example, if a prism based daylighting microstructure or typical groove microstructure is filled entirely with an adhesive, the optical properties of that microstructure may be modified. Therefore, controlling not only the area of adhesive application upon the surface (e.g., 50% or less of the surface area; or, such as 10% or less) but also the depth of the adhesive within the microstructures (e.g., ranging from 0% up to 100% of the groove depth) advantageously preserves the optical properties of such a daylighting film.

FIGS. 1A and 1B, provide an example of a daylighting microstructure that may be used advantageously with the aspects of the invention described herein. Referring to FIGS. 1A and 1B, a daylighting sheet or film 10 comprises a planar surface or base 12 and a second surface 14 opposite the base that defines a series of V groove microstructures providing a daylighting effect as is well known. Surface 14 is also referred to as the microstructure-defining surface. In FIG. 1A daylighting microstructures are provided as a series of V-shaped grooves 16 by methods that are well known and are described in U.S. Pat. No. 5,880,886 (Milner et al.), which is incorporated herein by reference as if set forth in full.

FIG. 1A shows an adhesive 24 such as pressure sensitive adhesive (PSA) that may be single or double sided, or any other suitable adhesive selected from the class of non-flowing adhesives, such as elastomers, acrylics, silicone resins, styrene block copolymers, or the like. Adhesive 24 is applied directly to all or selected elevated points of contact defined by flats 22 while leaving the grooves 16 untouched. Adhesive 24 also may be applied to touch only a percentage (e.g., less than 100%) of the flats 22 on the top of the grooves. It will be appreciated that the top surfaces of flats 22 defined between each series of V grooves further comprise corresponding raised or elevated positions—relative to the base 12—that provide surfaces, or points of adhesion, for direct adhesive contact against a corresponding glazing surface 30. Glazing surface 30 (FIG. 2) may comprise a window, including single pane or multiple panes of glass, or any type of glass, or equivalent glazing surface as shown in FIG. 2.

FIG. 1B shows a side view of another embodiment where a continuous coating or film 26 of transparent adhesive may be applied over the entire microstructure defining surface 14. The coating or film adhesive 26 may be applied only upon flats 22, or may be a peripherally disposed coating provided over the openings of the grooves 16 while leaving the interior of the grooves 16 untouched. It may also be applied to only a percentage of the groove area (e.g., less than 100%).

Referring to FIG. 1A, V grooves 16 comprise a series of grooves aligned adjacent to one another across a portion of or across an entire width of the microstructure defining surface 14 of sheet 10. Each microstructure V groove 16 is separated by two substantially flat surfaces or flats 22 having downwardly depending sidewalls angled relative to one another comprising a first reflecting surface 18 and a second reflecting surface 20. Either or both surfaces 18, 20 may be inclined at an angle relative to one another as well as to the planar surface/base 12 to form the daylighting microstructures.

Referring further to FIG. 1A, flats 22 comprise raised or elevated portions, relative to the base 12, of microstructure defining surface 14. Raised flats 22 provide elevated points of contact that are adapted for placement of transparent adhesive 24. It will be appreciated that adhesive 24 may be provided on all elevated points of contact defined by flats 22. Adhesive 24 also may be provided selectively on a selected portion or set of points of contact defined by flats 22.

In this regard, a locus is defined as a set of all points that share a property. With respect to the present invention, the locus of all elevated points of contact 22 provided with adhesive 24 define an optical adhesive surface or layer. For clarity on a macro scale, adhesive 24 is assumed to form an adhesive surface or layer. On a micro scale, adhesive 24 would have a finite thickness, and thus would have a first surface defined by the locus of all adhesively coated elevated points of microstructure-defining surface 14, and a second surface for contact with a glazing. However, for the sake of clarity, as is well understood by those skilled in the art, the locus or set of all elevated points provided with adhesive 24 is referred to on a macro scale as forming and/or defining an adhesive surface or layer.

Accordingly, the locus of all points of contact provided with adhesive 24 define an a optical adhesive surface or layer—for facilitating enhanced transmission of light through V shaped grooves, as taught in Milner et al. U.S. Pat. No. 5,880,886. Such an optical adhesive surface may be secured directly against a light incident glazing. The resulting optical construction advantageously enables orientation of microstructures outward, facing the incident light, and effectively sealed against the light incident glazing. In the case of V groove daylighting microstructures, this optical construction includes an optical adhesive surface for adhering the microstructure-defining surface directly against the glazing wherein the optical adhesive surface facilitates transmission of incident light over a wider range of sun elevation angles than was previously considered possible. This embodiment provides an optical construction that improves optical efficiency and optical properties of a V groove type daylighting microstructure. Please refer to operational example shown in FIGS. 12-15 infra. This optical construction enables the daylighting microstructure defining surface 14 to be adhered directly against a glazing such that the open ends of V grooves are facing the incident light and are effectively sealed against the glazing surface. The daylighting V groove microstructures thereby are protected against the ingress of dust, moisture, and other contaminants.

Note that in this and other optical constructions described herein, the daylighting microstructure defining surface 14 faces outward toward the incident light, being secured or substantially sealed against the light incident glazing 30. In contrast, conventional attachment methods attach the base of the daylighting sheet to the light incident glazing and face the daylighting microstructures away from the glazing and into the interior of a building.

In the case of daylighting sheets other than a V groove design, wherein the daylighting sheet is characterized by grooved microstructures, prisms, and/or flat topped prisms, or a combination thereof, an adhesive is provided for contacting all, or for selectively contacting at least a portion of elevated points (elevated relative to the base 12) on the microstructure defining surface 14, such as the topmost portions between V grooves, or posts between prisms, or top portions of prisms. Thus, the locus of all points of adhesive contact defines an optically neutral adhesive surface for direct, secure contact against a glazing. The resulting optical construction enables the daylighting microstructures to face outward against the light incident glazing. Such an optical construction does not adversely affect transmission of incident light beyond the surface area defined by the locus of all points of adhesive contact. In the case of a daylighting microstructure comprising a series of prisms, any degradation of optical efficiency may be minimized by selectively limiting the points of adhesive contact; such as by limiting the surface area of flat topped prisms or other elevated points for adhesive contact.

Such an optical construction likewise advantageously enables surface 14 defining the daylighting microstructures to be adhered directly against a glazing with the microstructures encased/substantially sealed against the glazing surface for protection against the ingress of dust, moisture, and other contaminants. The protection provided by direct adherence of all or a portion of the daylighting microstructures directly against a glazing also provides the advantage of long-term optical efficiency, and may prolong the useful life of a daylighting film. The protection afforded by this embodiment is optically neutral and does not degrade optical properties of daylighting microstructures. In the case of the V groove daylighting microstructures as described in U.S. Pat. No. 5,880,886, the foregoing arrangement has been found to improve optical properties over a wider range of sun elevation angles.

FIG. 2 shows a perspective view of how a daylighting sheet or film 10 is adhered directly to a transparent material such as glass or glazing surface 30. The adhesive may be applied either selectively to flats 22 or as an adhesive coating or a film over microstructure defining surface 14. This enables the grooves 16 to be positioned directly against contact surface 32 of the glazing 30 such that the incident light surface 34 through which light enters and the planar surface/base 12 of daylighting sheet 10 face away from one another. In this configuration, the adhesive has little or no adverse effect on daylighting sheet 10 such that the efficiency and light redirection remain substantially unchanged. Grooves 16 of daylighting sheet 10 advantageously are encased or sealed against the glazing surface and protected against incursion of dust, water and other materials that would degrade optical performance. This provides a further advantage of obviating any need for a cover sheet to protect the microstructures.

Figure 3A:
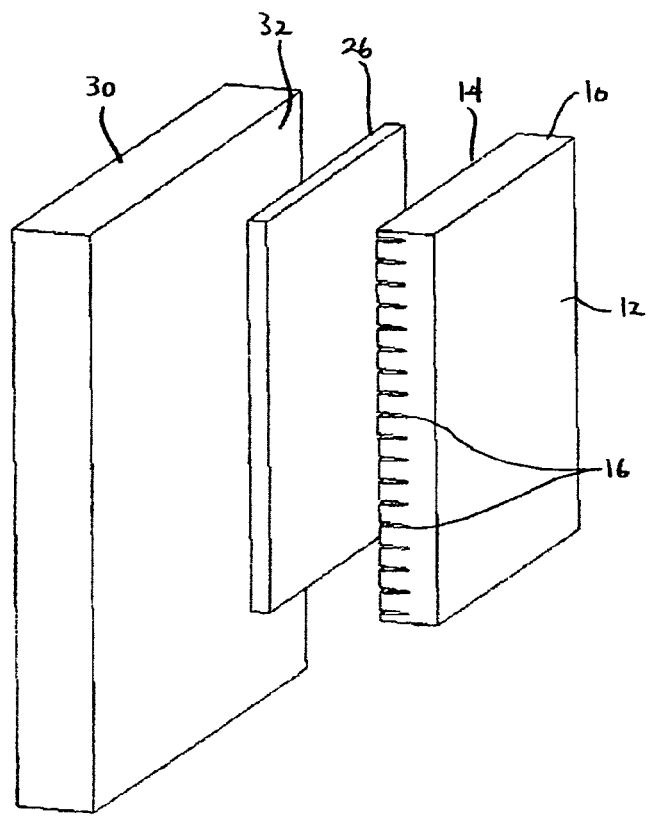
FIGS. 3A and 3B show perspective assembly and side views, respectively, of a daylighting sheet or film adhered directly to the glazing along the grooved interface according to an aspect of the invention.
Figure 3B:
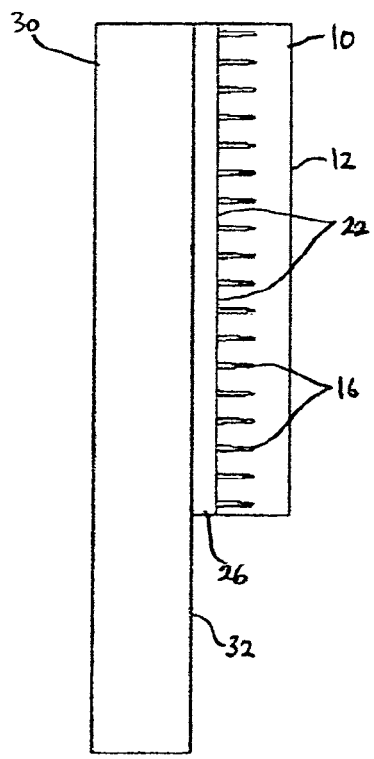

FIGS. 3A and 3B show a perspective assembly and side views, respectively, of the assembly of FIG. 2 illustrating how the continuous adhesive coating or film 26 may be applied directly over or upon the second surface or interface 14 for direct attachment to first contact surface 32 of glazing 30. The thickness of the adhesive coating or film 26 is drawn illustratively and may be varied as described in further detail herein.

Figure 4A:
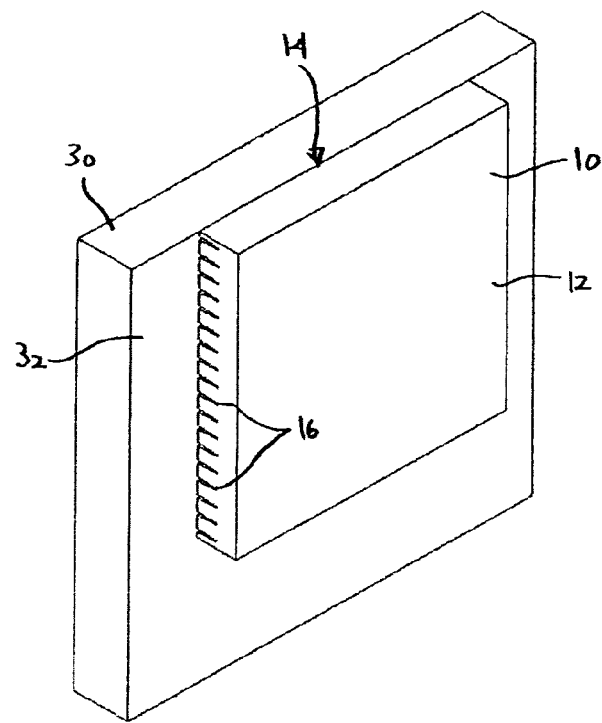
FIGS. 4A and 4B show perspective and side views of another attachment variation where the grooved interface of the daylighting sheet or film may be attached directly to the glazing without adhesives according to an aspect of the invention.
Figure 4B:
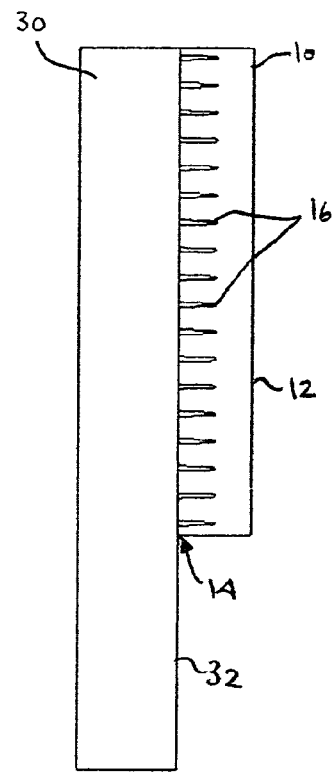

Another embodiment is shown in the perspective and side views of FIGS. 4A and 4B, that show microstructure defining surface 14 of daylighting sheet 10 having grooves 16 adhered directly to contact surface 32 of glazing 30 in the manner set forthwith reference to FIGS. 1A and 1B. In this embodiment a microstructure-defining surface 14 of daylighting sheet 10 may be directly adhered to transparent material/glazing 30 without the use of any adhesives. Attaching the daylighting sheet 10 to glazing 30 without any adhesives provides the advantages of eliminating the cost and handling of adhesives, and obviates degradation of optical performance of the daylighting sheet due to potential misapplication of adhesives. Accordingly, in accordance with this embodiment, the daylighting sheet 10 is fabricated from a material having self-adhesive properties. This enables microstructure-defining surface 14 of daylighting sheet 10 to be mounted directly to the glazing 30 using direct pressure activated contact. The daylighting sheet 10 may be fabricated from a self-adhering material such as a non-rigid polymer selected from the group consisting of PVC, urethane, thermoplastic acrylic resin or the like. To adhere the daylighting sheet to the glazing, one preferably applies uniform pressure at a desired temperature, wherein the amount of pressure, duration of its application, and temperature are sufficient to initiate the self-adhering properties of the material.

A non-limiting example of attachment may involve simply applying water (and optionally soap) to the transparent material 30 (and/or to second surface 14 of the daylighting sheet 10) to displace air prior to or during placement of the daylighting sheet 10 against the contact surface 32. The posts or flats 22 formed along second surface or interface 14 of daylighting sheet 10 may facilitate the adherence of the daylighting sheet directly to the contact surface 32. Once the water has dried, the daylighting sheet 10 may remain secured to the transparent material 30 with no adhesives. Any soap residue (if used) may remain, as its presence may be negligible with respect to the optical performance of the daylighting sheet 10.

In yet other variations as shown in FIGS. 1A, 1B, 5A, 5B, an adhesive may be applied over microstructure-defining surface 14 in various patterns or configurations upon different portions of flats 22. In such configurations, the adhesive may be applied to cover the microstructure defining surface 14 at some percentage less than 100% of the surface area, e.g., 50% or less of the surface area or 10% or less of the surface area. The adhesive thus does not touch every flat 22 between the grooves 16 and thereby minimizes contact with the grooves 16 to a relatively low percentage. The formation of air bubbles between the daylighting sheet 10 and glazing 30 may be eliminated during mounting because of the reduced area of adhesive coverage.

Moreover, because the surface area of the adhesive between the microstructure defining surface 14 and adjacent glazing is relatively low, this reduces the force required to remove the daylighting sheet 10 from the glazing 30. This advantageously protects the glazing and facilitates repositioning upon the glazing surface 30, or removal from the glazing.

Figure 5A:
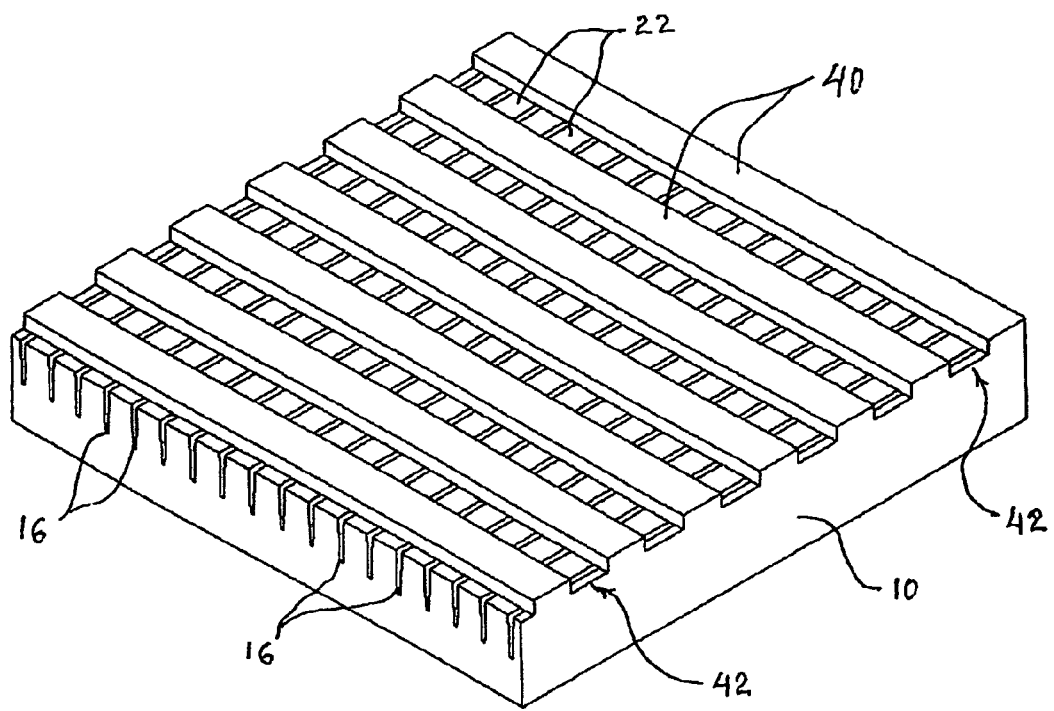
FIG. 5A shows a perspective view of another variation wherein the adhesive is patterned linearly over a grooved interface for attachment to a glazing according to an aspect of the invention.

A further variation is shown in the perspective view of FIG. 5A which illustrates daylighting sheet 10 having linearly aligned portions of adhesive 40 placed transversely relative to microstructure grooves 16. The linearly aligned lengths of adhesive 40 may be laid adjacent to one another such that gaps/offsets 42 are formed between adjacent lengths. As described above, the cumulative surface area of the adhesive 40 may combine to be less than 100% of the surface area of the second surface 14 (e.g., 50% or less of the surface area of second surface 14 or 10% or less of the surface area). In this variation, the lengths are illustrated as linear lines although the adhesive 40 may be aligned at any number of angles relative to the grooves 16, such as 45 degrees, etc., or they may be non-uniform in width and/or length. Alternatively, rather than being uniform lengths, the adhesive 40 may instead be laid in any various shape or pattern such as waves, zig-zags, discontinuous lines, etc.

Figure 5B:
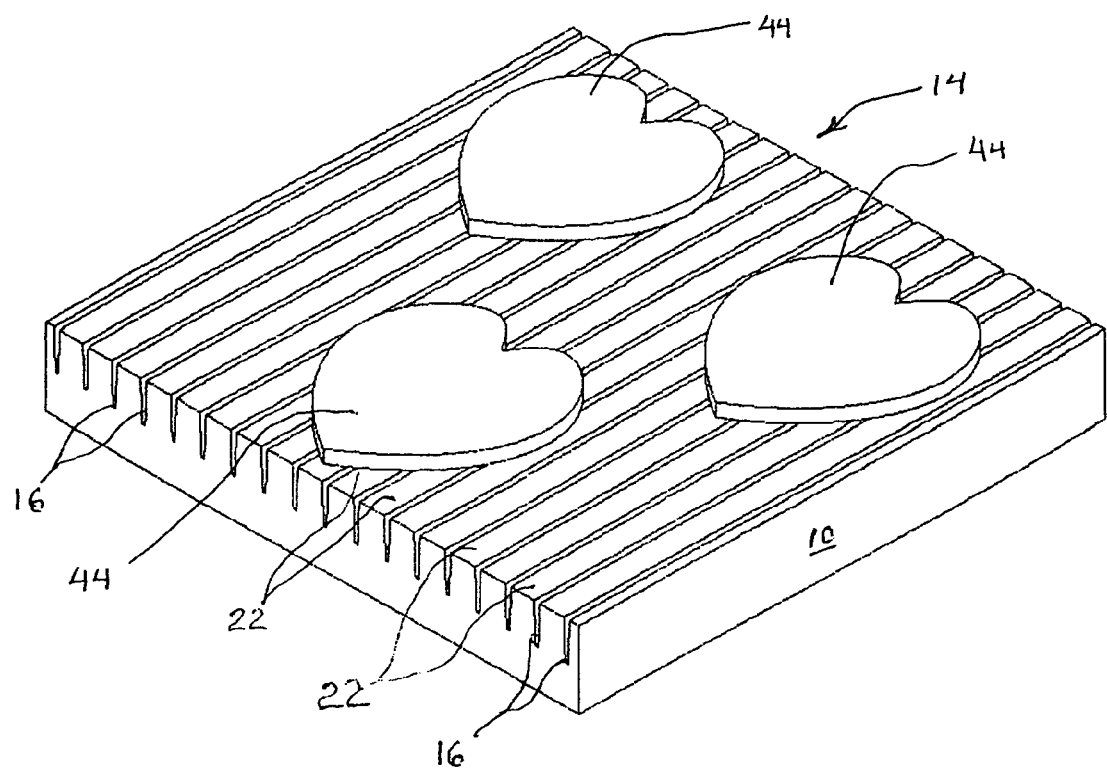
FIG. 5B shows a perspective view of another variation wherein the adhesive is patterned in various configurations over a grooved microstructure defining surface according to an aspect of the invention.

In other alternatives, the adhesive may be laid in various patterns such as decorative shapes, company logos or watermarks, or any other figure or illustration. For instance, FIG. 5B shows a perspective view of patterned adhesive 44 (in this example shown as heart logos) that may be positioned at various locations around microstructure-defining surface 14. In this and other embodiments where adhesives are used to adhere daylighting sheet 10 to a transparent body such as glazing 30, the adhesive may be clear or optionally may contain various light diffusing particles. The embodiment shown in FIG. 5B shows a patterned adhesive 44 provided as a logo to enhance the graphical pattern of a logo while also yielding a daylighting function. Any logo-decorative or conveying meaning, can be expressed and still provide a daylighting effect. For prism-based microstructures, the logo will appear/be defined as a clear region.

In the non-limiting example shown in FIG. 5B, a logo 44 is defined by an adhesive selectively provided on a microstructure defining surface 14 defining series of V grooves 16 separated by flats 22 as in FIGS. 1A and 1B. In FIG. 5B, an adhesive is applied directly to selected points of contact defined by flats 22 while leaving the interior of grooves 16 substantially untouched. In this case, applying adhesive on selected points of contact in a predetermined pattern or configuration results in a locus of all adhesively contacted points providing an optically neutral adhesive surface that in turn defines a logo, or one or more symbols for conveying meaning. The locus of all points of adhesion defining each logo provide an adhesive surface for effectively sealing the microstructures/microstructure-defining surface 14 against a corresponding window, glass, or glazing surface.

An adhesive is provided in a controlled manner for contacting only selected portions or points of adhesion that define the logo 44. Therefore, the locus of all adhesively contacted points provide both a logo as well as an optically enhanced adhesive surface that enhances optical efficiency and optical properties in the case of a V groove type microstructure. The locus or set of all adhesively contacted points defines an optical adhesive surface that enables any daylighting microstructure design, such as grooves or prisms to be sealed against an adjacent glazing, thereby protecting the microstructures from ingress of moisture, dust, and other contaminants.

As is well known, light diffusing or light scattering particles may be incorporated into the adhesive as a matrix to enhance the appearance of the logo. For example, glass or polymer micro spheres/beads are common for introducing diffusion into an adhesive or other matrix. The index of refraction of the microspheres or beads must be slightly different from the surrounding matrix.

Figure 5C:
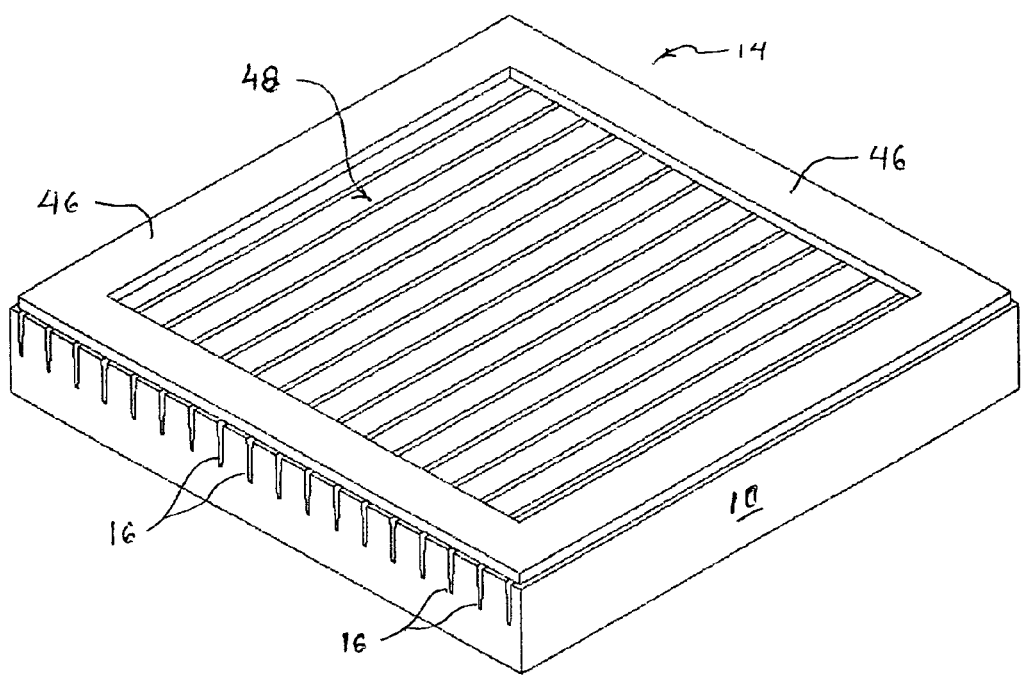
FIG. 5C shows a perspective view of yet another variation wherein an adhesive border is applied to a periphery around the grooved microstructure defining surface according to an aspect of the invention.

Another variation is shown in the perspective view of FIG. 5C where the adhesive may be applied around a microstructure-defining surface 14 to form a sealed adhesive border 46 around a periphery of the daylighting sheet 10. Forming an adhesive border 46 defines an open area 48 surrounded by border 46 which may also minimize contamination of the grooves 16 from edges particularly if the adhesive is made slightly viscous such that it migrates into the groove 16. The application of adhesive peripheral border 46 allows for the direct placement of the grooves 16 against a glazing that minimizes any loss of optical properties. And, peripheral border 46 protects the microstructures from ingress of moisture, dust and contaminants that would degrade optical properties and shorten the useful life of the daylighting sheet.

Figure 6A:
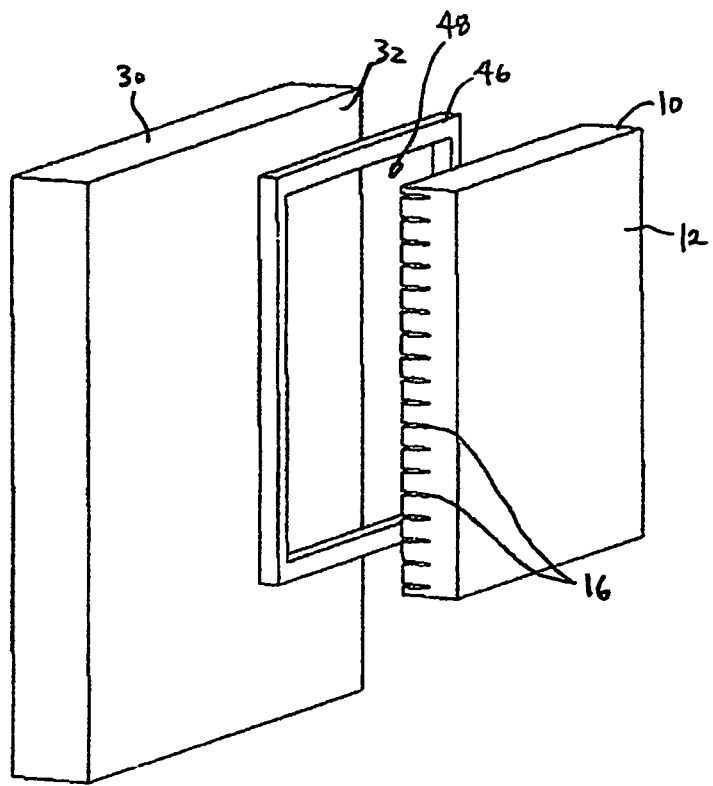
FIGS. 6A and 6B show perspective assembly and side views, respectively, of a daylighting sheet or film attached directly to a glazing by an adhesive border according to an aspect of the invention.
Figure 6B:
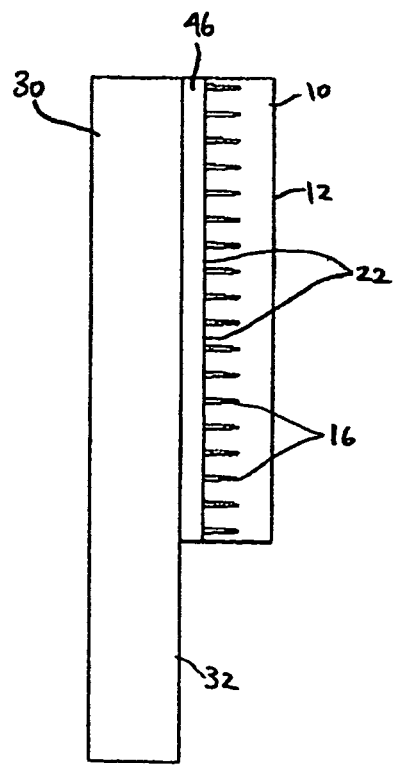

FIGS. 6A and 6B show perspective assembly and side views of the variation of FIG. 5C where the adhesive border 46 may be formed around a periphery of the interface between daylighting sheet 10 and transparent material/glazing 30. Although shown as a continuous border, the adhesive border 46 alternatively may be formed along just a few of the edges, e.g., opposite edges along the top/bottom or sides, or the adhesive border 46 may be applied as a discontinuous border such that the open area 48 is not sealed entirely around the periphery of daylighting sheet 10.

Figure 6C:
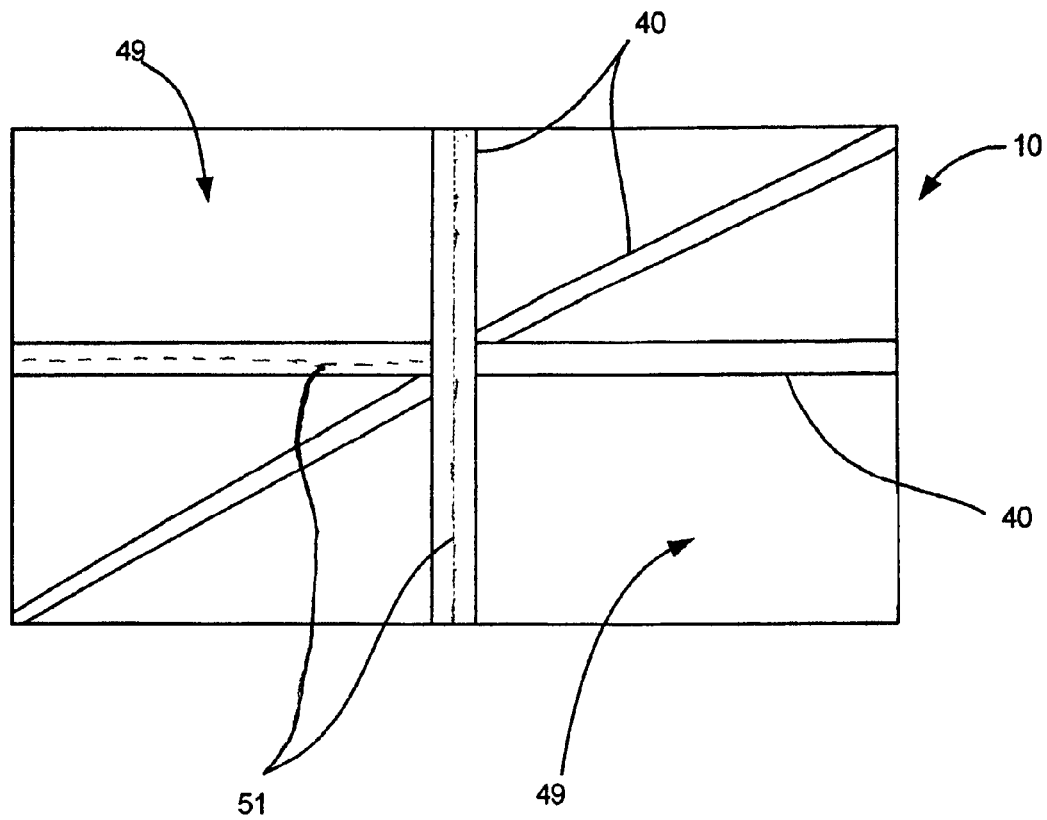
FIG. 6C shows a variation of a peripheral border shown in FIGS. 6A and 6B.

FIG. 6C shows a variation of a peripheral border shown in FIGS. 5C, 6A and 6B. Referring to FIG. 6C, an adhesive is provided vertically, horizontally, or diagonally on a corresponding series of elevated points of the microstructure defining surface 14 of daylighting sheet 10. The locus of all points of adhesive contact define one or more adhesive surfaces 40 that further define one or more interior panes 49 of daylighting sheet 10 for securing the microstructure defining surface 14 against the glazing and for preventing curl, or bow, of the daylighting sheet. The adhesive surfaces 40 also could be concealed behind or used to attach a decorative strip of plastic or metal. This variation also may be used as a technique to hide a seam 51 joining two daylighting sheets behind a decorative strip. This would allow different widths and lengths of daylighting sheets to be sealed against a glazing without revealing any seams.

Figure 7A:
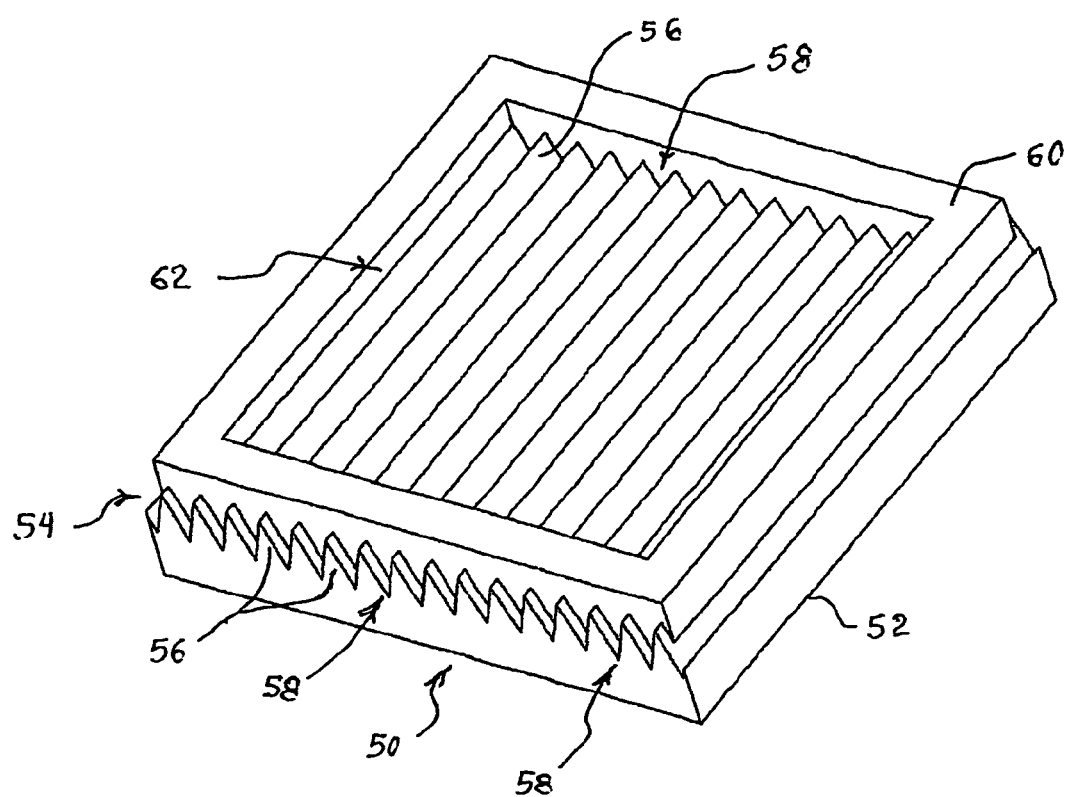
FIG. 7A shows a perspective view of a daylighting sheet or film having its microstructures formed as prisms with a border of adhesive applied directly to the prism interface surface for direct attachment to a glazing according to an aspect of the invention.

While the previous variations have utilized daylighting sheets having flats 22 formed between the grooves 16, the adhesives may also be applied directly to daylighting sheets having microstructures formed as prisms without flats or posts in between the individual prism elements. One variation is illustrated in the perspective view of FIG. 7A. FIG. 7A shows daylighting sheet or film 50 having a substantially flat planar base 52 and an opposite microstructure-defining surface 54 in which are formed daylighting microstructures such as prisms 56 that define linear, or curved, V-shaped grooves 58 aligned adjacent to one another. As previously discussed, the adhesive may be applied over the surface area of microstructure defining surface 54 such that the percentage of area covered is less than 100%, e.g., 50% or less of the surface area, or 10% or less of the surface area. In this variation, the adhesive may be applied as an adhesive border 60 directly over the prisms 56 such that the adhesives entirely fill the grooves 58 as shown. With the adhesive filled entirely within the grooves 58 around a periphery of the daylighting sheet 50, an open area 62 is defined within the adhesive border 60.

Figure 7B:
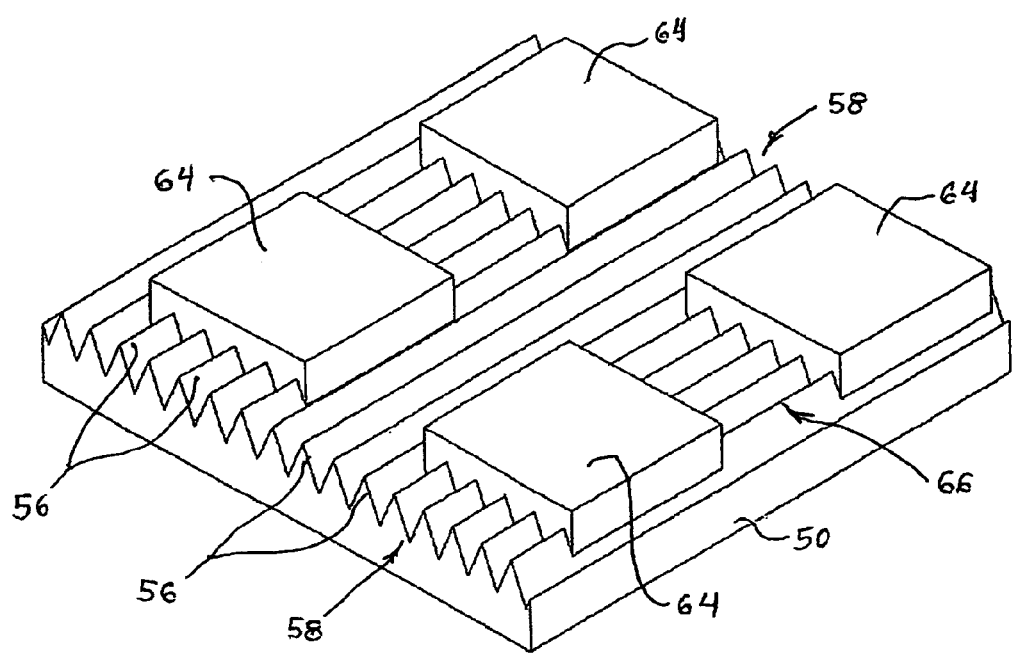
FIG. 7B shows a perspective view of a prism daylighting sheet or film wherein the adhesive is patterned (<100% contact) in various configurations directly upon the prism interface according to an aspect of the invention.

Another variation is shown in the perspective view of FIG. 7B which illustrates daylighting sheet 50 having one or more areas of patterned adhesive 64 applied directly upon the prisms 56 such that the grooves 58 are filled beneath the applied adhesives. Regions of unobstructed gaps 66 may be formed and (as previously described) the patterned adhesive 64 may be applied in any number of shapes and configurations directly upon the prisms 56.

Figure 8A:
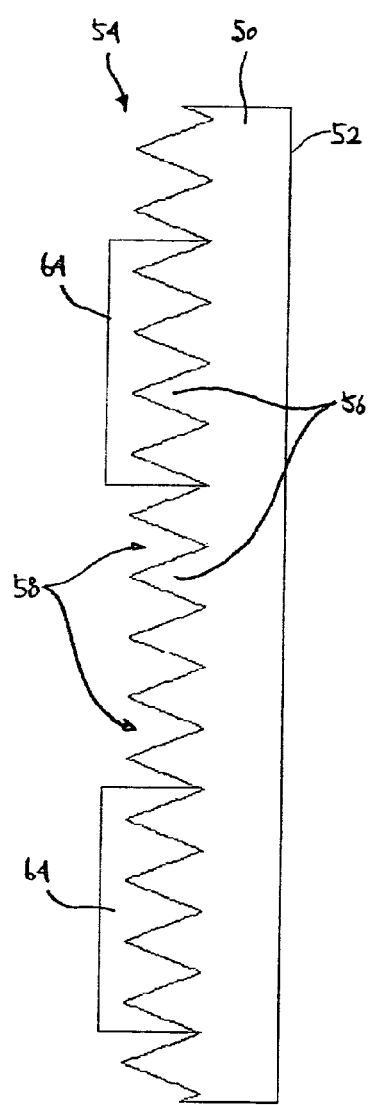
FIGS. 8A and 8B show side views of a prism daylighting sheet or film having a patterned adhesive for direct attachment to a glazing according to an aspect of the invention.
Figure 8B:
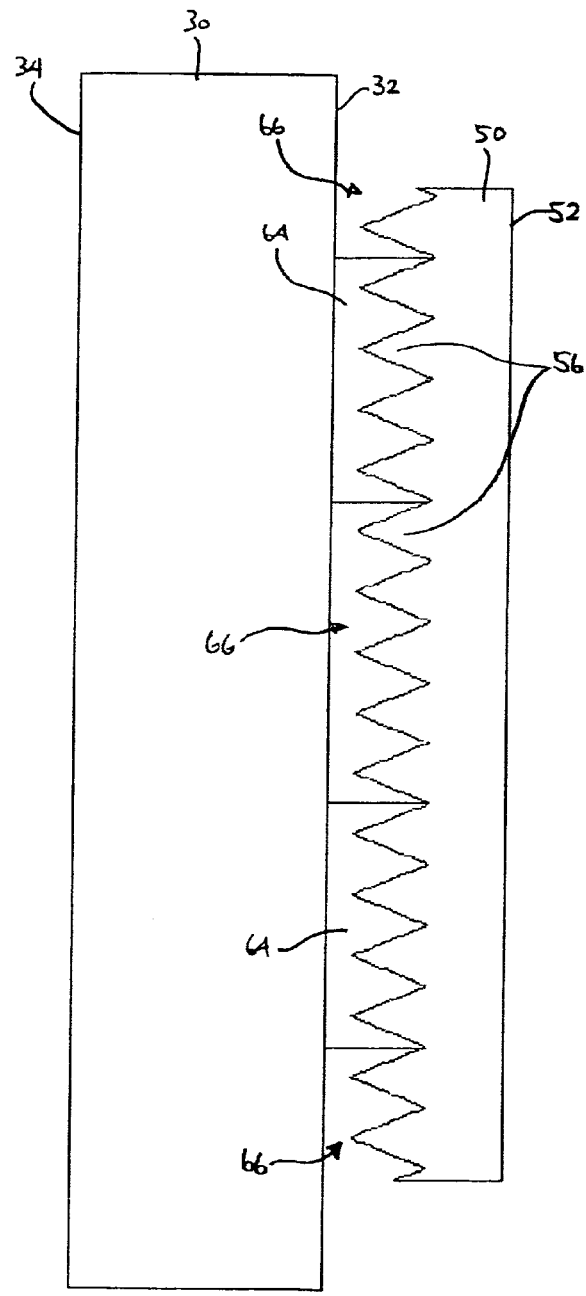

FIGS. 8A and 8B illustrate side views of a daylighting sheet 50 with the adhesive applied over the prisms 56 both alone and adhered to transparent material/glazing 30. As shown, adhesive 64 may be applied upon the prisms 56 such that the adhesive material fills the entire depth of the groove 58 underlying the adhesive material. When the daylighting sheet 50 and adhesive are placed against the contact surface 32 of glazing 30, the daylighting sheet 50 may be pressed against the adhesive such that the tops of the prisms 56 are spaced at a distance from the contact surface 32, as shown. Alternatively, the daylighting sheet 50 may be pressed such that the tops of the prisms 56 directly contact against the contact surface 32.

Although the grooves are illustrated as being filled in this variation by the adhesive, this feature is intended to be applicable to any of the other variations described herein. For example, as shown in FIGS. 6A and 6B, the underlying grooves 16 of daylighting sheet 10 may be filled entirely by the adhesives placed upon second surface 14 in any of the variations herein.

Figure 9A:
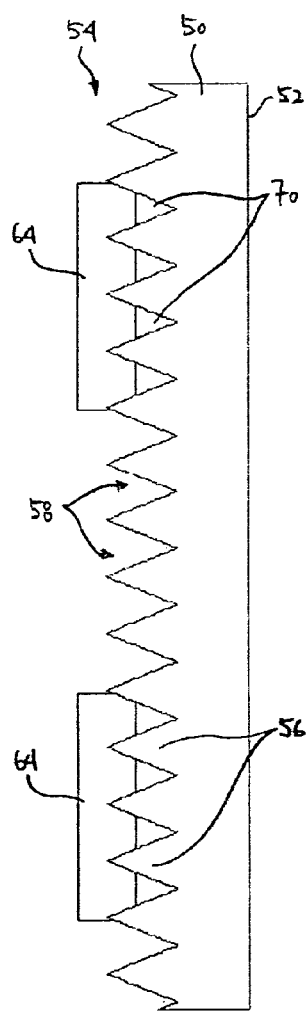
FIGS. 9A and 9B show side views of a prism daylighting sheet having a patterned adhesive applied directly upon the sheet at a controlled partial depth according to an aspect of the invention.
Figure 9B:
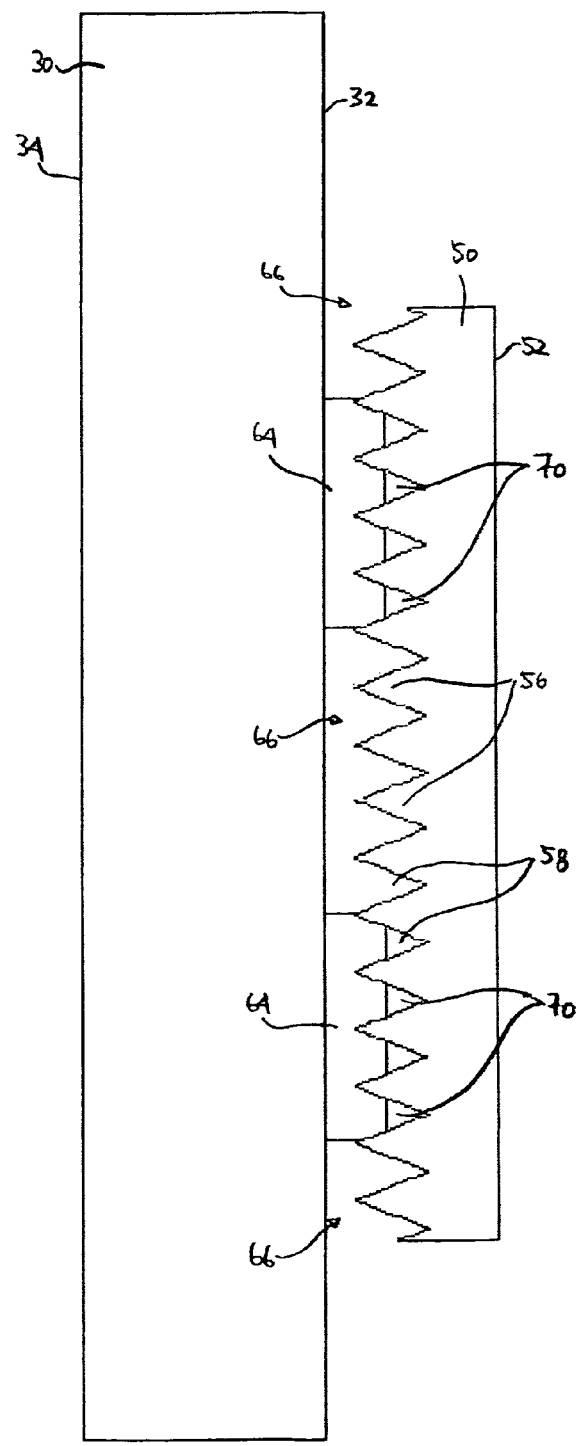

Referring to FIGS. 9A, and 9B, in yet another alternative, rather than filling the grooves 58 entirely with an adhesive material 64, the depth to which the adhesive flows may be controlled such that the adhesive only partially fills the underlying groove.

An example of a closely controlled adhesive is shown in the side views of FIGS. 9A and 9B which illustrate side views of the daylighting sheet 50 with the adhesive applied over the prisms 56 at a partial depth both alone and adhered to transparent material 30. The adhesive may be prevented from flowing entirely into the depth of the grooves 58 such that gaps 70 are formed within the groove 58 beneath the applied adhesive. With the adhesive applied at a controlled depth, the daylighting sheet 50 may be adhered directly to the contact surface 32 such that the tops of the prisms 56 are placed either at a distance from the contact surface 30 or are placed in direct contact, as described above.

Note: when the adhesive wets out the prisms it does two things as follows: 1) it lowers optical efficiency of a prism and 2) it provides a see-through function in a formerly non-see-through prism structure. This property may be used selectively to provide see through regions of a daylighting film, if desired.

Factors that determine migration of an adhesive into a grooved microstructure are as follows. Assuming a 50 um pressure sensitive adhesive (PSA) layer and that is pushed onto a prism structure, the adhesive depth on the grooves may or may not be about 50 um. The adhesive may migrate down the grooves and be even deeper than 50 um because there may be displaced PSA material that can only move down. Adhesive migration can be determined by many factors during lamination such as pressure, temperature, and curing speed. Therefore, PSA migration into a groove can be zero or as much as the depth of the groove depending on the groove size. Actual lamination trial and empirical investigation may be needed to determine the optimum PSA migration.

Alternatively, when a PSA spans a gap, such as defined by the opening of a groove, the size of the gap will affect the PSA migration, meaning that the smaller the gap the less chance of PSA migration. However, factors such as pressure, temperature, and coagulation rate will play a major factor for adhesive migration. Also, not all PSA formulations are created equal. Depending on the manufacturer, some might be more stable and less susceptible to migration than others.

Figure 10:
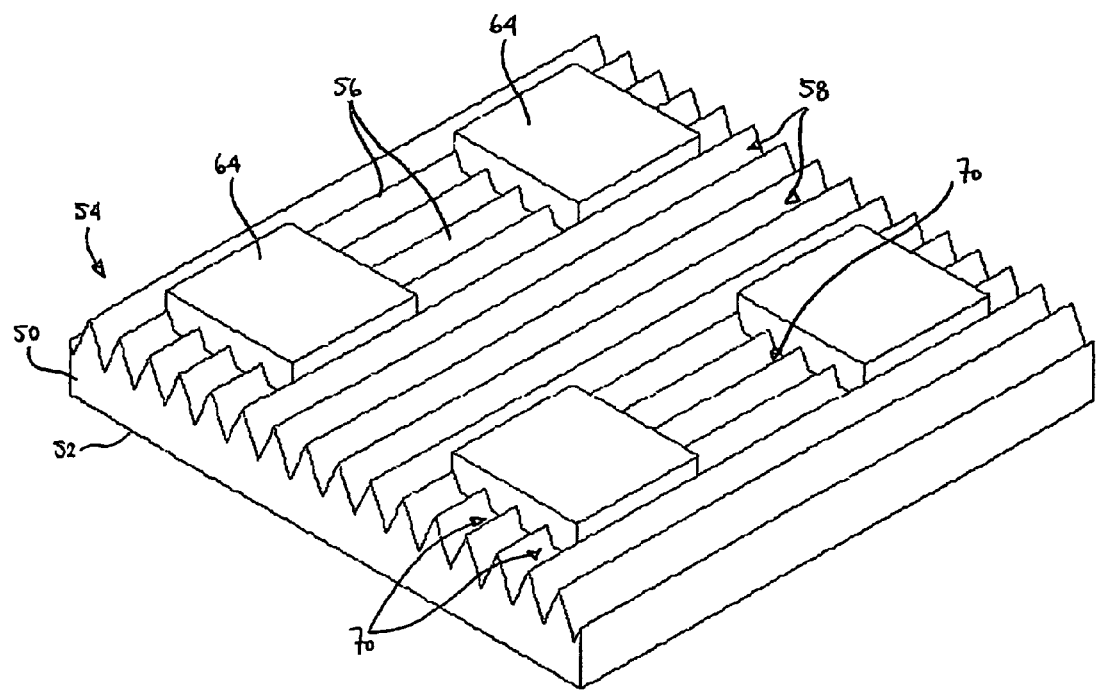
FIG. 10 shows a perspective view of a patterned adhesive applied at a controlled partial depth upon a daylighting sheet or film according to an aspect of the invention.

FIG. 10 shows a perspective view of patterned adhesive 64 applied directly upon the prisms 56 while maintaining gaps 70 beneath the adhesive areas. As described above, the adhesive 64 may be applied in any number of patterns or configurations while also maintaining the gaps 70 beneath the adhesive.

Similarly, although the grooves are illustrated as being partially filled in this variation by the adhesive, this feature is also intended to be applicable to any of the other variations described herein. For example, referring to FIG. 1B, the underlying grooves 16 of daylighting sheet 10 may be partially filled by the adhesives placed upon second surface 14 by controlling the depth of adhesive migration in any of the variations herein.

Figure 11A:
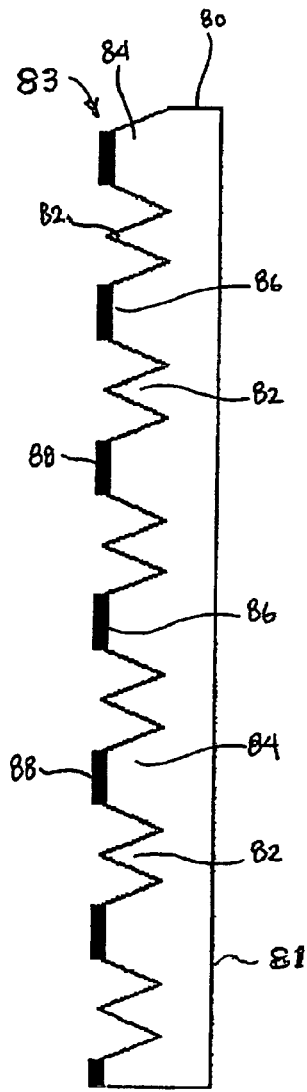
FIGS. 11A, 11B, and 11C show side views of daylighting microstructures characterized by various forms, such as a series of alternating V grooves, prisms, and flat-topped prisms, separated by a series of troughs or depressions.

In yet another variation, FIG. 11A shows a side view of a daylighting film or sheet 80 having a base 81 and a microstructure defining surface 83 opposite the base. Microstructure defining surface 83 is provided with a combination of prisms 82 that are formed between flat topped prisms (or posts) provided with flats 86 formed upon the flat topped prisms 84. Flats 86 provide raised or elevated points of adhesion, relative to base 81. Flats 86 advantageously may be used in conjunction with adhesive 88 to provide an optical construction with a glazing surface that does not significantly degrade the optical/daylighting properties of the daylighting sheet. By selectively providing adhesive only on selected flats 86, optical efficiency would be reduced by no more than the extent of surface area of flats 86 that are provided for points of adhesion.

Flats 86 are located above the peaks of the adjacent simple prisms 82 and adhesive 88 may be applied upon all or a selected portion of the tops of the flats 86 to facilitate direct attachment of the grooved microstructure defining surface 83 directly against a glazing surface, as described herein. The flats 86 of prisms 84 may be alternated between prisms 82 to control a see-through function of the daylighting sheet 80 by controlling a ratio of the flat topped prisms/posts to prisms 82.

In this case, the flats 86 form elevated points of contact, relative to the base 81 for providing a adhesive. The locus of all points contacted with the adhesive provide an optically neutral, light transmissive surface for securing the microstructure defining surface 83 against an adjacent glazing surface. The resulting optical construction advantageously seals the day lighting microstructures against the glazing to prevent ingress of dust and contaminants that would degrade optical efficiency as set forth above.

Figure 11B:
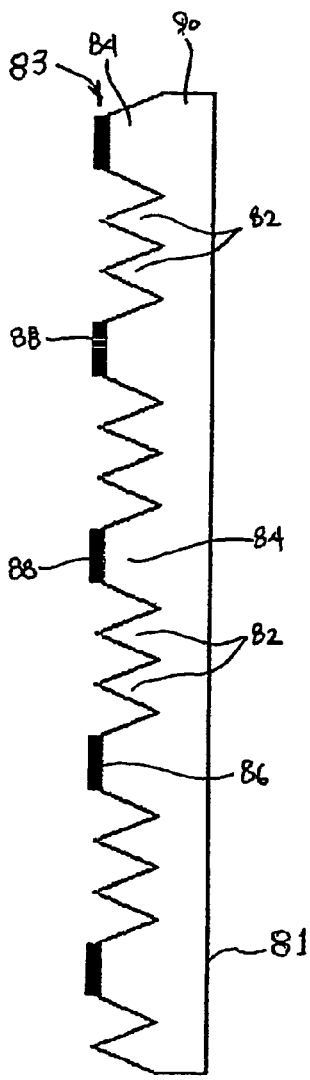
Figure 11C:
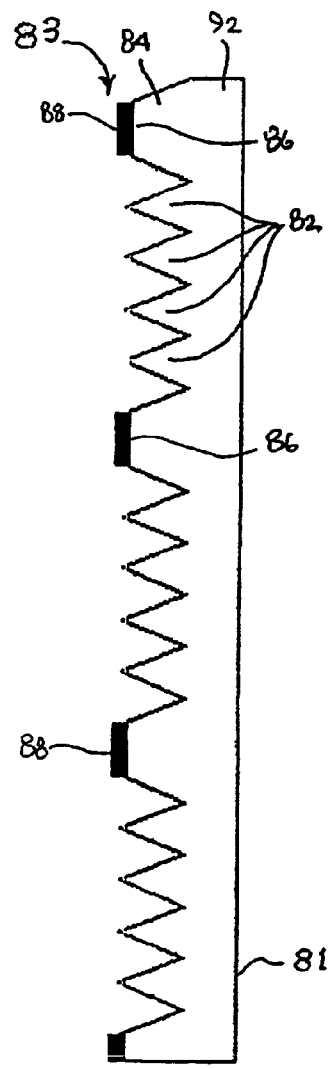

Thus, the number and ratio of flat topped prisms 84 may be varied, e.g., two prisms 82 in-between flats 86, as shown in the side view of daylighting film or sheet 90 in FIG. 11B, or four prisms 82 in-between flats 86, as shown in the side view of daylighting film or sheet 92 in FIG. 11C. In alternative embodiments, the number of flat-topped prisms (posts) and prisms, as well as their relative positioning, may be varied depending upon the optical properties desired. Any of the features described herein may be applied in combination with any of the above described daylighting sheets as well.

Operational Example

Figure 12:
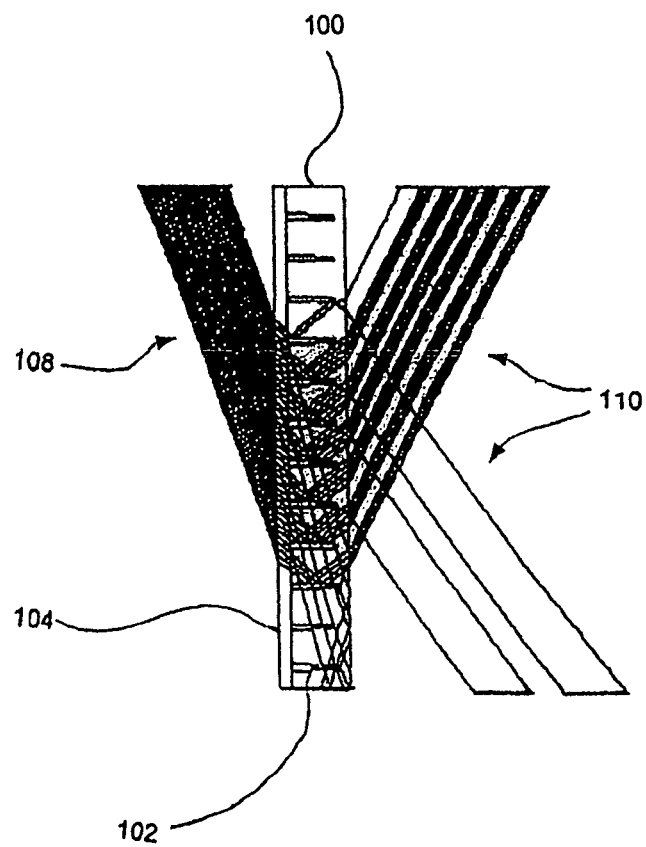
FIG. 12 shows an operational example of the invention for enhancing optical performance, efficiency and light transmission through a daylighting film or sheet comprising a series of V groove microstructures at a sun elevation angle of 70 degrees according to an aspect of the invention.
Figure 13:
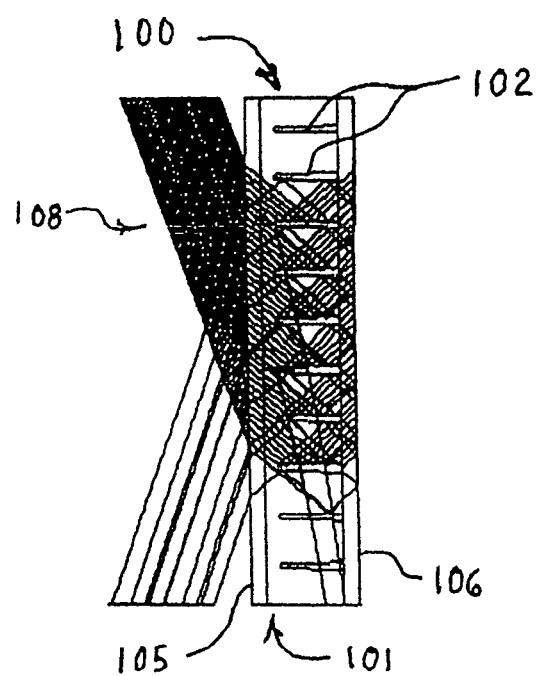
FIG. 13 shows an operational example of a negative effect on optical performance at a sun angle of 70 degrees in a conventional configuration for adhering a daylighting sheet or film to a glazing.

FIGS. 12-15 show operational examples of the invention for enhancing optical performance and light transmission through a daylighting sheet or film comprising a series of V groove microstructures (Milner et al. U.S. Pat. No. 5,880, 886). The examples in FIGS. 12 and 13 are established by virtual goniometer modeling that shows intensity of transmitted light through the daylighting microstructures for various elevation angles of incident light. For FIGS. 12 and 13, the sun elevation angle is 70 degrees.

In the operational example of FIG. 12, a daylighting film or sheet 100 comprises a series of light redirecting microstructures characterized by V grooves 102. The wide or open ends of V grooves 102 are attached directly to a glazing surface (omitted for clarity) by optical adhesive surface 104 (the index of refraction of the glazing and adhesive are assumed to be equal in this analysis) in accordance with the aspects of the present invention described herein.

Referring to FIG. 12, incoming incident light 108 at a solar elevation angle of 70 degrees passes through a glazing (omitted for clarity) and through optical adhesive 104, and into daylighting film 100 where the open ends of grooves 102 are facing the incident light, 108. Grooves 102 redirect light into the interior of a room or structure as shown by transmitted rays, 110. As shown in FIG. 12, optical performance of the daylighting sheet 100 comprising V groove microstructures 102 is enhanced with the open ends of the V grooves directly adhered to a glazing surface through optical adhesive 104 and facing incident light 108. As shown in FIG. 12, the open ends of the V grooves point left towards incident light 108, and are directly adhered against a glazing surface by the adhesive methods described above. Optical performance is improved by the invention's advantages wherein an optical adhesive surface or layer 104 enables the wide or open ends of V groove microstructures 102 to be oriented outward toward incident light entering through a glazing. The optical adhesive seals open ends of the V grooves against the glazing, effectively sealing the V groove microstructure against optical degradation by dust and contaminants. A further enhancement of optical properties of a V grooved daylighting microstructure is demonstrated by the light transmission characteristics through the V groove microstructures as shown in FIGS. 12-15.

Figure 14:
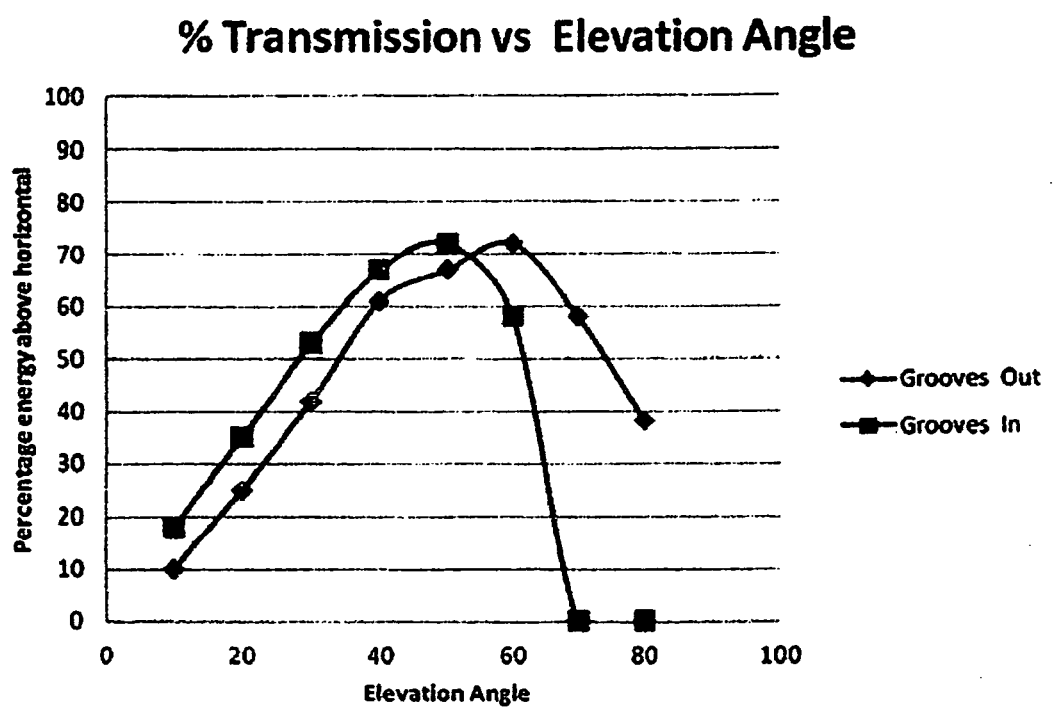
FIG. 14 shows a graphical representation of a comparison of optical performance between the orientations of daylighting microstructures shown in FIGS. 12 and 13.

Referring to FIG. 13, a daylighting film or sheet 100 has a base 101 and a microstructure-defining surface opposite the base characterized by a series of light redirecting V-groove microstructures 102. The base 101 is adhered to a glazing by a layer of adhesive 105 in a conventional manner (here the glazing is again omitted for clarity as the index of refraction of the glazing and adhesive are assumed to be equal). In this configuration, open ends of the V groove microstructures 102 point to the right, away from the glazing and away from incident light shown at 108. Open ends of V groove microstructures 102, are provided with an integral, and index matched, cover sheet 106, to prevent ingress of dust. It is shown in FIG. 13 that transmission of incident light 108 is substantially reduced at the 70-degree elevation angle, as compared to the optical construction of FIG. 12, and is disadvantageously limited to a more narrow range of sun elevation angles, as shown in FIG. 14.

Referring again to FIG. 12, optical performance is enhanced by implementing an optical construction according to the invention, using an optical adhesive surface to enable V grooves to be engaged or sealed directly against the glazing surface facing incident light. As shown, using the invention to implement this configuration results in increased light passing through the daylighting sheet over a wider range of sun elevation angles. Therefore, the daylighting effect of V groove microstructures can be achieved more efficiently for projecting light into the interior of a room or building.

Reasons for enhanced optical performance of the invention for adhering a daylighting sheet to a glazing as shown in FIG. 12 are as follows:

The microstructures providing the daylighting effect—such as V grooves—are sealed against the glazing and protected against dust, scratches, contaminants and other factors that degrade optical performance.

Optical performance is improved for V groove microstructures at high elevation angles. See FIGS. 12-15. A cover sheet to protect the microstructures is eliminated, thereby lowering cost. □

Note, implementation of the invention with a V groove microstructure is particularly advantageous, because the V grooves can be covered by a continuous adhesive without degrading optical performance.

FIG. 14 shows a graphical representation of a comparison of optical performance of light at varying sun elevation angles between the two orientations of microstructures shown in FIGS. 12 and 13. The optical performance of grooves facing outward (wide or open end of the grooves adhered against the glazing surface and facing incident light) is preferred as indicated by the plot. However, the "grooves in" performance (FIG. 13) is better from 10 to 50 degrees elevation angle. The salient difference between the two orientations occurs near 70 degrees elevation angle, when there is no significant daylighting transmission for the "grooves-in" orientation at angles greater than ~55°.

Figure 15:
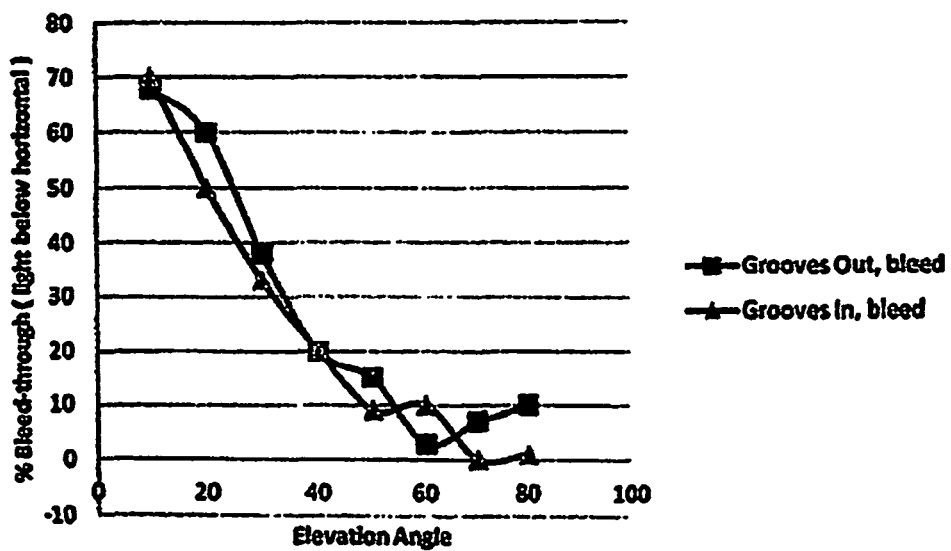
FIG. 15 shows a graphical representation or plot of the approximate values of light transmission below the horizontal for the daylighting orientations shown in FIGS. 12 and 13.

FIG. 15 shows a graphical representation or plot of the approximate values of light transmission below the horizontal for the orientations shown in FIGS. 12 and 13. Light transmission below the horizontal is labeled as bleed through. In this regard, the two orientations (grooves out/in) of the daylighting film are not significantly different. However, one observes more bleed through at 70 and 80° for the grooves out orientation. Further, for elevation angles from 0 to 40° there is significant light, or bleed through, below the horizontal axis for both orientations. This is exactly what we would expect for see-through designs.

While the invention has been described in connection with what are presently considered to be the most practical and preferred embodiments, it is to be understood that the invention is not limited to the disclosed embodiments, but rather is intended to cover various modifications and equivalent arrangements. The applications of the devices and methods discussed above are not limited to the attachment of daylighting sheets, but may include any number of equivalent daylighting configurations. Moreover, the devices and methods described herein may be applied to the attachment of daylighting sheets to other light transmissive structures, surfaces, and materials besides windows and glazing surfaces.

Therefore, persons of ordinary skill in this field are to understand that all such equivalent structures are to be included in the scope of the following claims.

What is claimed is:

1. A method of attaching a daylighting sheet to a transparent glazing surface for receiving incident light, wherein the daylighting sheet comprises a base and a microstructure-defining surface opposite the base defining a series of light controlling microstructures selected from the group consisting of troughs, grooves, prisms, and posts further define a series of elevated points and troughs relative to the base, comprising the steps of:
providing an optical adhesive for adhesively contacting substantially only selected elevated points, such that the selected elevated points of adhesive contact provide an optically transmissive adhesive for contacting the glazing such that troughs, grooves, prisms, and posts of the light controlling microstructures face the incident light;
engaging the microstructure-defining surface directly against the glazing with an applied pressure, such that the adhesive effectively seals light controlling microstructures against the glazing surface.

2. A method of attaching a daylighting sheet to a glazing surface as in claim 1, wherein the step of providing an adhesive contacting substantially only selected elevated points in a selected peripheral region comprises providing an adhesive vertically, horizontally, or diagonally on a corresponding series of elevated points on the microstructure defining surface of the daylighting sheet, such that the locus of all points of adhesive contact define one or more corresponding panes for securing the microstructure defining surface against the glazing, such that the panes substantially prevent curl or bow of the daylighting sheet.

3. A method of attaching a daylighting sheet to a glazing surface as in claim 2, including the step of attaching a decorative strip of plastic or metal to at least a portion of the daylighting sheet for hiding a seam for joining two or more daylighting sheets behind the decorative strip.

4. A method of attaching a daylighting sheet to a glazing surface for receiving incident light, wherein the daylighting sheet comprises a base and opposite microstructure-defining surface defining a series of V groove microstructures, each V groove having an open end with sidewalls depending downwardly toward the base and angled relative to one another to provide a first reflecting surface and a second reflecting surface, and each V groove separated from an adjacent V groove by a corresponding flat region, elevated relative to the base, the method comprising:
providing an adhesive contact on substantially only selected flat regions separating the V grooves, such that the adhesively contacted points define an optical adhesive surface wherein open ends of the V grooves face incident light thereby facilitating improved transmission of incident light through the V grooves over a wider range of sun elevation angles;
applying the optical adhesive surface with pressure directly against the glazing surface, such that open ends of the V grooves are effectively sealed against the glazing.

5. A method of attaching a daylighting sheet to a glazing surface as in claim 4, wherein the step of providing an adhesive contact further comprises adhesively contacting all or a portion of points that define a selected peripheral region defined within a perimeter of the microstructure-defining surface, such that the locus of all points of adhesive contact provide a peripherally disposed optical adhesive surface for securing the microstructure defining sheet against the glazing.

6. A method of attaching a daylighting sheet to a glazing surface as in claim 5 further comprising: providing an adhesive in a vertical, horizontal, diagonal, or other linear direction on a corresponding series of elevated points, such that the points of adhesive contact define one or more optical adhesive surfaces that further define corresponding panes for securing the microstructure defining surface against the glazing and for preventing curl or bow of the daylighting sheet.

7. A method of attaching a daylighting sheet to a glazing for receiving incident light, wherein the daylighting sheet comprises a base and an opposite surface defining a series of daylighting microstructures characterized by a plurality of prisms having elevated points relative to the base, the prisms further defining linear, compound linear, or curved V-shaped grooves aligned substantially adjacent to one another comprising:
  providing an adhesive for contacting substantially only selected elevated points of the prism, such the adhesively contacted elevated points define an optical adhesive surface that effectively seals the series of microstructures against the glazing, facing the incident light.

8. A method as in claim 7 wherein the step of providing an adhesive includes the step of allowing the adhesive to fill in at least a partial depth of the linear, compound linear, or curved V-shaped grooves defined by the prisms.

9. A method of attaching a daylighting sheet to a glazing surface for receiving incident light, wherein the daylighting sheet comprises a base and an opposite surface defining a series of elevated points relative to the base, including a combination of prisms formed between flat topped prisms or posts, comprising the steps of:
  providing an adhesive for contacting at least a portion of the elevated points, such that a locus of all adhesively contacted posts defines an optical adhesive surface;
  applying the adhesive surface with pressure directly against the glazing surface such the combination of prisms formed between flat topped prisms or posts faces the incident light and is effectively sealed against the glazing from contaminants or moisture.

10. The method of any of claim 1, 4, 7, or 9, wherein the step of providing an adhesive further comprises the step of applying the adhesive on substantially only selected points of contact in a predetermined pattern or configuration, such that the adhesively contacted points define a light transmissive decorative pattern, a logo, or one or more symbols for conveying meaning.

11. An optical construction for daylighting comprising; a daylighting sheet comprising a base, and a microstructure-defining surface opposite the base for defining a series of light redirecting structures selected from the group consisting of: V grooves, prisms, modified prisms, posts, or a combination of prisms, and grooves, the light redirecting structures having elevated portions relative to the base, adapted for points of adhesive contact;
  a light transmissive adhesive provided on substantially only selected points of adhesive contact, such that adhesively contacted points define an optical adhesive surface, sealing the light redirecting microstructures against a glazing surface for receiving incident light.

12. An optical construction according to claim 11, wherein the points of adhesive contact define a peripheral region about a perimeter of the daylighting sheet for effectively sealing the light redirecting microstructures against the glazing.

13. An optical construction as in claim 12 wherein the points of adhesive contact define one or more optical adhesive surfaces within the peripheral region that further define corresponding panes for securing the microstructure defining surface against the glazing and for preventing curl, or bow, of the daylighting sheet.

14. An optical construction according to claim 11 wherein the selected points of adhesive contact define an optical adhesive surface comprising an incident light facing logo, a decorative pattern, or one or more symbols for conveying meaning.

15. An optical construction for daylighting comprising: a daylighting sheet comprising a base and a light redirecting surface opposite the base comprising a series of V groove microstructures, each V groove having an opening facing the incident light and sidewalls depending downwardly from the opening toward the base and angled relative to one another to provide a first reflecting surface and a second reflecting surface, and each V groove separated from an adjacent V groove by a corresponding flat region that is elevated with respect to the base;
  an adhesive contacting substantially only selected points of the elevated flat regions, such that the adhesively contacted points define an optical adhesive surface sealing the open ends of the V grooves against a glazing surface for receiving incident light, such that incident light is transmitted over a wide range of sun elevation angles.

* * * * *